United States Patent [19]
Yamashita et al.

[11] Patent Number: 5,504,680
[45] Date of Patent: Apr. 2, 1996

[54] SLIP CONTROL SYSTEM FOR VEHICLE

[75] Inventors: Tetsuhiro Yamashita; Kohji Hirai, both of Hiroshima, Japan

[73] Assignee: Mazda Motor Corporation, Hiroshima, Japan

[21] Appl. No.: 189,171

[22] Filed: Jan. 31, 1994

[30] Foreign Application Priority Data

Feb. 4, 1993 [JP] Japan .................. 5-042044

[51] Int. Cl.⁶ .................. B60K 28/16
[52] U.S. Cl. .......... 364/426.03; 180/197; 364/426.02
[58] Field of Search .............. 364/426.01, 426.02, 364/426.03, 157, 182; 180/197; 303/139, 140, 161

[56] References Cited

U.S. PATENT DOCUMENTS

| | | | |
|---|---|---|---|
| 5,070,461 | 12/1991 | Nobumoto et al. | 364/424.03 |
| 5,070,960 | 12/1991 | Nobumoto et al. | 180/197 |
| 5,082,081 | 1/1992 | Tsuyama et al. | 180/197 |
| 5,219,212 | 6/1993 | Shimada et al. | 303/92 |
| 5,407,023 | 4/1995 | Yamashita et al. | 180/197 |
| 5,418,726 | 5/1995 | Yagi | 364/426.03 |

FOREIGN PATENT DOCUMENTS

| | | |
|---|---|---|
| 1197160 | 3/1989 | Japan . |
| 238149 | 4/1990 | Japan . |

*Primary Examiner*—Michael Zanelli
*Attorney, Agent, or Firm*—Sixbey, Friedman, Leedom & Ferguson; Gerald J. Ferguson, Jr.; Donald R. Studebaker

[57] ABSTRACT

A traction control system for a vehicle detects the amount of slip of the driving wheels of the vehicle and controls the torque transmitted to the road surface with a predetermined control variable when the amount of slip of the driving wheels exceeds a predetermined threshold value so that the amount of slip of the driving wheels converges on a target value. A return gain is set according to the value of the control variable when the slip of the driving wheels comes into a predetermined state of convergence, and the control variable is corrected with the return gain so that the control variable is forced to be small.

12 Claims, 10 Drawing Sheets

SLIP CONTROL SYSTEM FOR VEHICLE

BACKGROUND OF THE INVENTION

1. Field of the Invention

This invention relates to a slip control system for a vehicle, and more particularly to a slip control system for a vehicle in which the accelerating performance when the slip of the control wheels is converging on a target value is improved.

2. Description of the Prior Art

There has been put into practice a traction control system which detects the amount of slip of the driving wheels and controls the engine output and/or application of braking force to the wheels so that the amount of slip of the driving wheels converges on a target value, thereby preventing deterioration of acceleration of the vehicle due to an excessive driving torque transmitted to the driving wheels when the vehicle is to be accelerated. Many vehicles are provided with a traction control system as well as an anti-skid brake system. See, for instance, Japanese Unexamined Patent Publication No. 1(1989)-197160.

In the traction control system disclosed in Japanese Unexamined Patent Publication No. 2(1990)-38149, the target value for the traction control on which the amount of slip of the driving wheels is to be converged is set smaller when the vehicle is making a turn.

In the conventional system, the lateral acceleration acting on the vehicle is detected and the target value for the traction control is set smaller as the lateral acceleration increases, thereby suppressing slip of the inner driving wheels and preventing deterioration of the driving stability.

Though the target value is set smaller as the lateral acceleration increases and the engine output is greatly suppressed when the vehicle is making a turn, the traction control is terminated and the normal control is resumed when the slip of the driving wheels converges on the target value for a predetermined time.

In the conventional traction control, the control variable is kept as it is to keep the engine output suppressed for said predetermined time even after the slip of the driving wheels converges, which results in deterioration of the accelerating performance immediately before and after the end of the traction control.

When the lateral acceleration is large, the target value for the traction control is set smaller, when the friction coefficient $\mu$ of the road surface is high, the target value is set smaller and when the vehicle is making a sharp turn and the amount of slip of the inner driving wheel is large, the control variable of the traction control is set larger, and accordingly the accelerating performance immediately before and after the end of the traction control is especially deteriorated in these conditions.

Further when the friction coefficient $\mu$ of the road surface suddenly changes from low to high, slip of the driving wheels quickly converges. Also in such a case, the accelerating performance can deteriorate.

SUMMARY OF THE INVENTION

In view of the foregoing observations and description, the primary object of the present invention is to provide a slip control system for a vehicle in which the accelerating performance immediately before and after the end of the traction control is improved.

A slip control system for a vehicle in accordance with the present invention comprises a traction control means for effecting traction control in which the amount of slip of the driving wheels of the vehicle relative to the road surface is detected and the torque transmitted to the road surface is controlled with a predetermined control variable when the amount of slip of the driving wheels exceeds a predetermined threshold value so that the amount of slip of the driving wheels converges on a target value and characterized in that a return gain is set according to the value of the control variable when the slip of the driving wheels comes into a predetermined state of convergence, and the control variable is corrected with the return gain so that the control variable is forced to be small.

In one embodiment of the present invention, the return gain is set according to the lateral acceleration of the vehicle so that the return gain becomes larger with increase in the lateral acceleration of the vehicle.

With this arrangement, the accelerating performance when the traction control is terminated during a turning can be surely improved.

In another embodiment of the present invention, the return gain is set according to the difference between the wheel speeds of the inner and outer driving wheels of the vehicle so that the return gain becomes larger with increase in the difference between the wheel speeds of the inner and outer driving wheels.

With this arrangement, the accelerating performance when the traction control is terminated during a sharp turning can be surely improved.

In still another embodiment of the present invention, the return gain is set according to the friction coefficient $\mu$ of the road surface so that the return gain becomes larger with increase in the friction coefficient $\mu$ of the road surface.

With this arrangement, the accelerating performance when the traction control is terminated during running on a high friction-coefficient road can be surely improved.

DESCRIPTION OF THE PREFERRED EMBODIMENT

Figure 1:
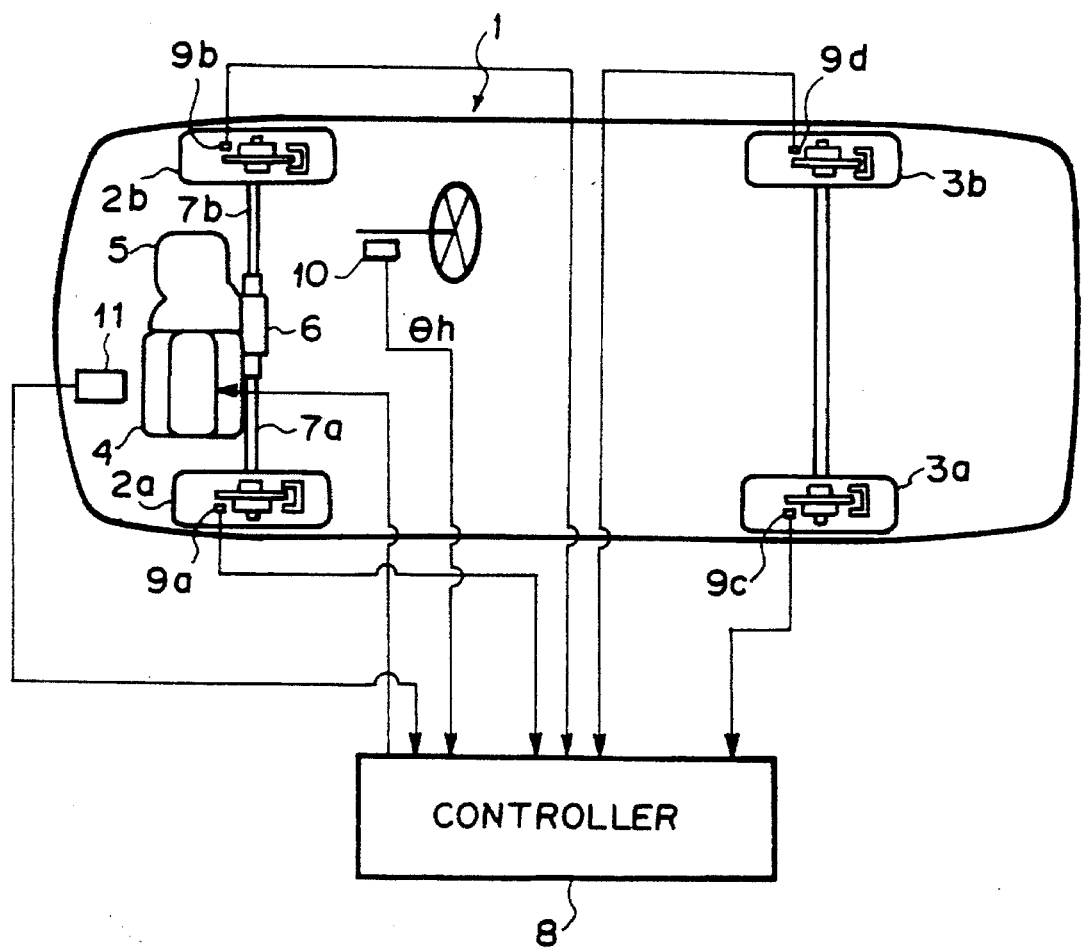
FIG. 1 is a schematic view of a vehicle provided with a slip control system in accordance with an embodiment of the present invention.

In FIG. 1, a vehicle 1 provided with a slip control system in accordance with an embodiment of the present invention has left and right front wheels 2a and 2b and left and right rear wheels 3a and 3b. Driving torque output from a V-6 engine 4 is transmitted to the left and right front wheels 2a and 2b through an automatic transmission 5, a differential 6 and left and right drive shafts 7a and 7b. That is, in the vehicle 1, the front wheels 2a and 2b are the driving wheels and the rear wheels 3a and 3b are the driven wheels.

A controller 8 effects fuel injection control and ignition timing control of the engine 4 and slip control (traction control) of the vehicle 1. The controller 8 has an engine control section for effecting the fuel injection control and the ignition timing control and a slip control section for effecting the slip control. Detecting signals from wheel speed sensors 9a to 9d which respectively detects the speeds of the wheels 2a, 2b, 3a and 3b, a steering angle sensor 10 which detects the turning angle of a steering wheel, an engine speed sensor 11 and brake sensors which respectively detect braking conditions on the wheels 2a, 2b, 3a and 3b are input into the controller 8.

The controller 8 comprises an input interface for receiving the detecting signals from the sensors described above, a pair of microcomputers including CPU, ROM and RAM, an output interface, driving circuits for a igniter and fuel injection valves and the like. In the ROM of the microcomputer for the engine control section are stored control programs for the fuel injection control and the ignition timing control and tables and maps for the same. In the ROM of the microcumputer for the slip control section are stored control programs for the slip control and tables and maps for the same. In the RAM there are provided various memories, soft counters and the like.

The slip control effected by the slip control section of the controller 8 will be briefly described, hereinbelow. The slip control section first calculates the actual radius of turn Rr, the steering-angle-based radius of turn Ri (to be described later), the vehicle speed V (speed of the vehicle body) and the friction coefficient μ of the road surface on the basis of the detecting signals from the sensors described above. Then the slip control section calculates the lateral acceleration G and calculates on the basis of the lateral acceleration G a correction coefficient k for correcting a threshold value for determination of slip and a target control value T so that they are reduced as the lateral acceleration G increases.

Then the slip control section calculates the amount of slip, effects determination of slip, sets the target control value T and calculates a control level FC for controlling the engine output and outputs a control signal for the slip control to the engine control section.

The slip control in this embodiment is characterized in that when slip of the driving wheels comes into a predetermined state of convergence, the control variable for the traction control is forced to be small by a return gain, thereby improving the accelerating performance immediately before and after the end of the traction control, the return gain being set to be larger as the lateral acceleration, the friction coefficient μ of the road surface and/or the difference in the wheel speed between the inner and outer driving wheels increase.

The slip control (traction control) performed by the slip control section will be described with reference to FIGS. 2 to 11, hereinbelow.

Figure 2:
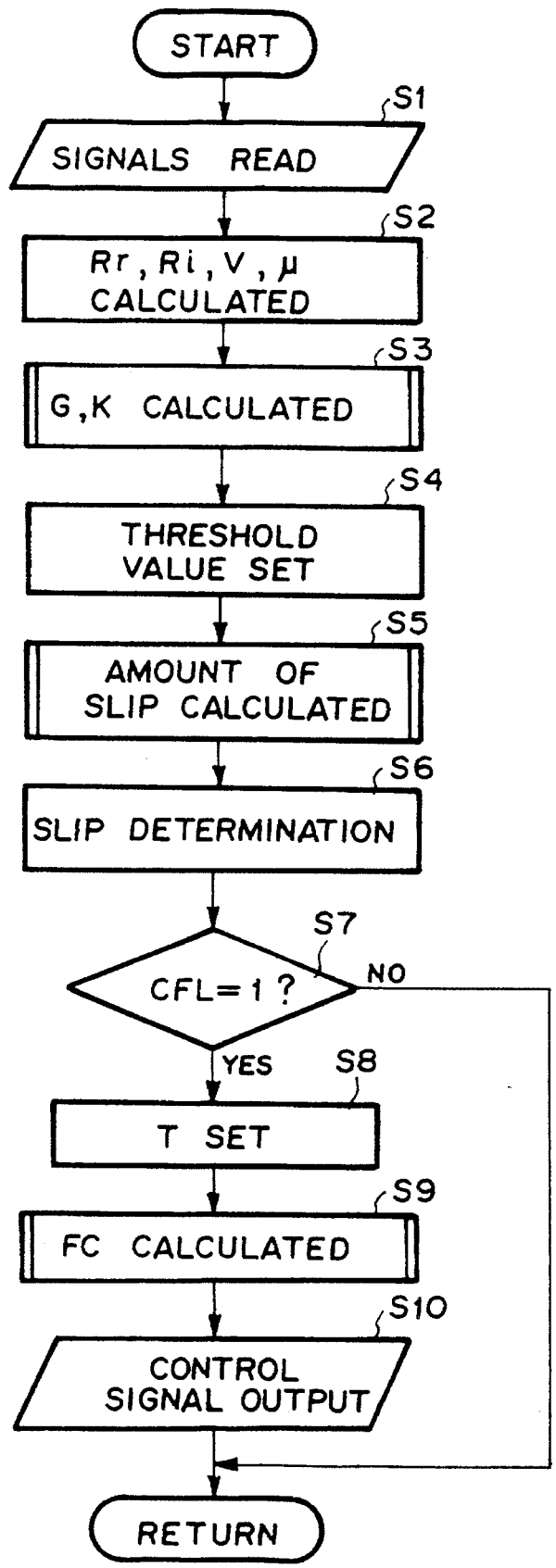
FIG. 2 is a flow chart for illustrating the routine of the slip control.
Figure 3:
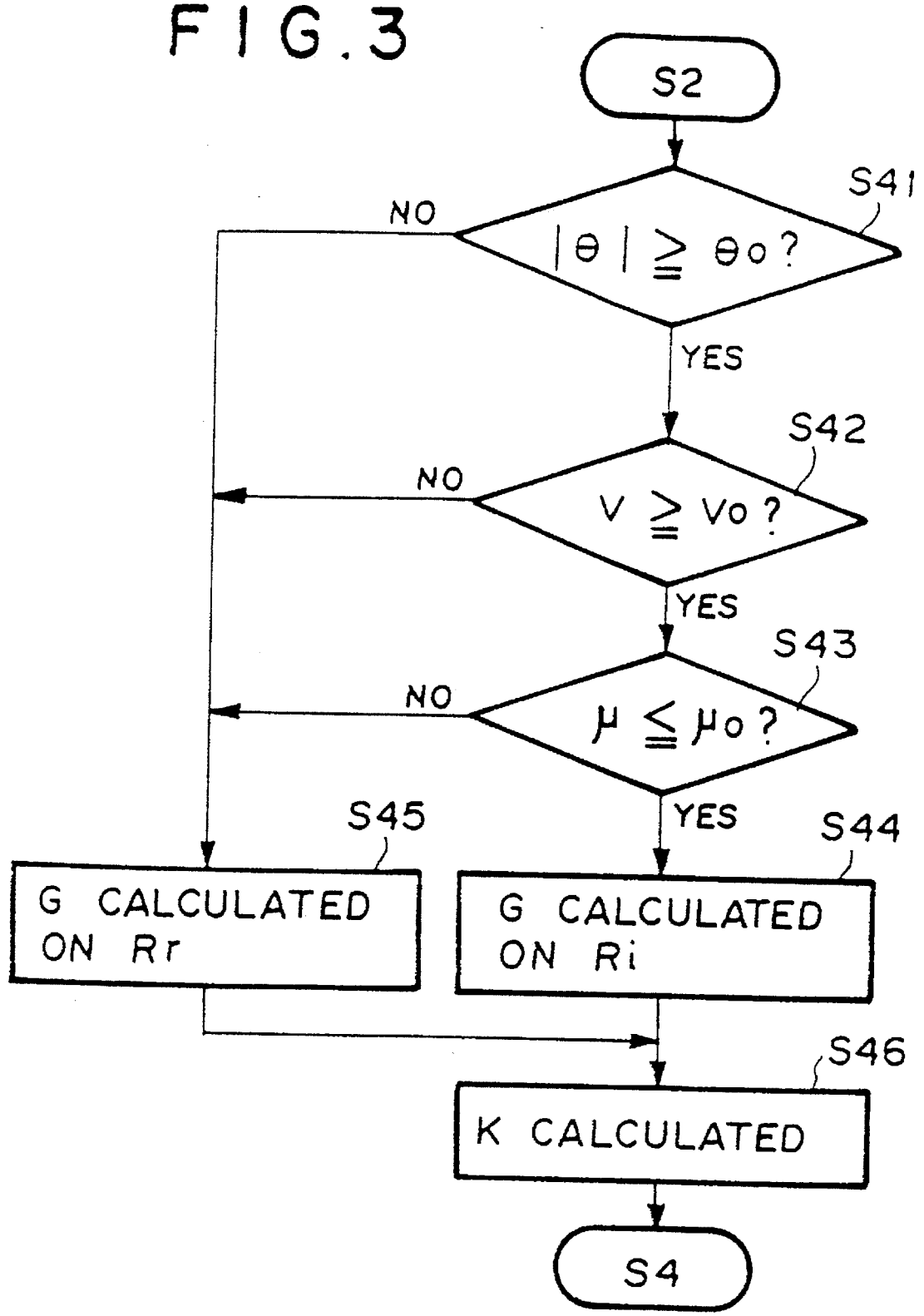
FIG. 3 is a flow chart for illustrating the routine of step S3 of the flow chart shown in FIG. 2.
Figure 4:
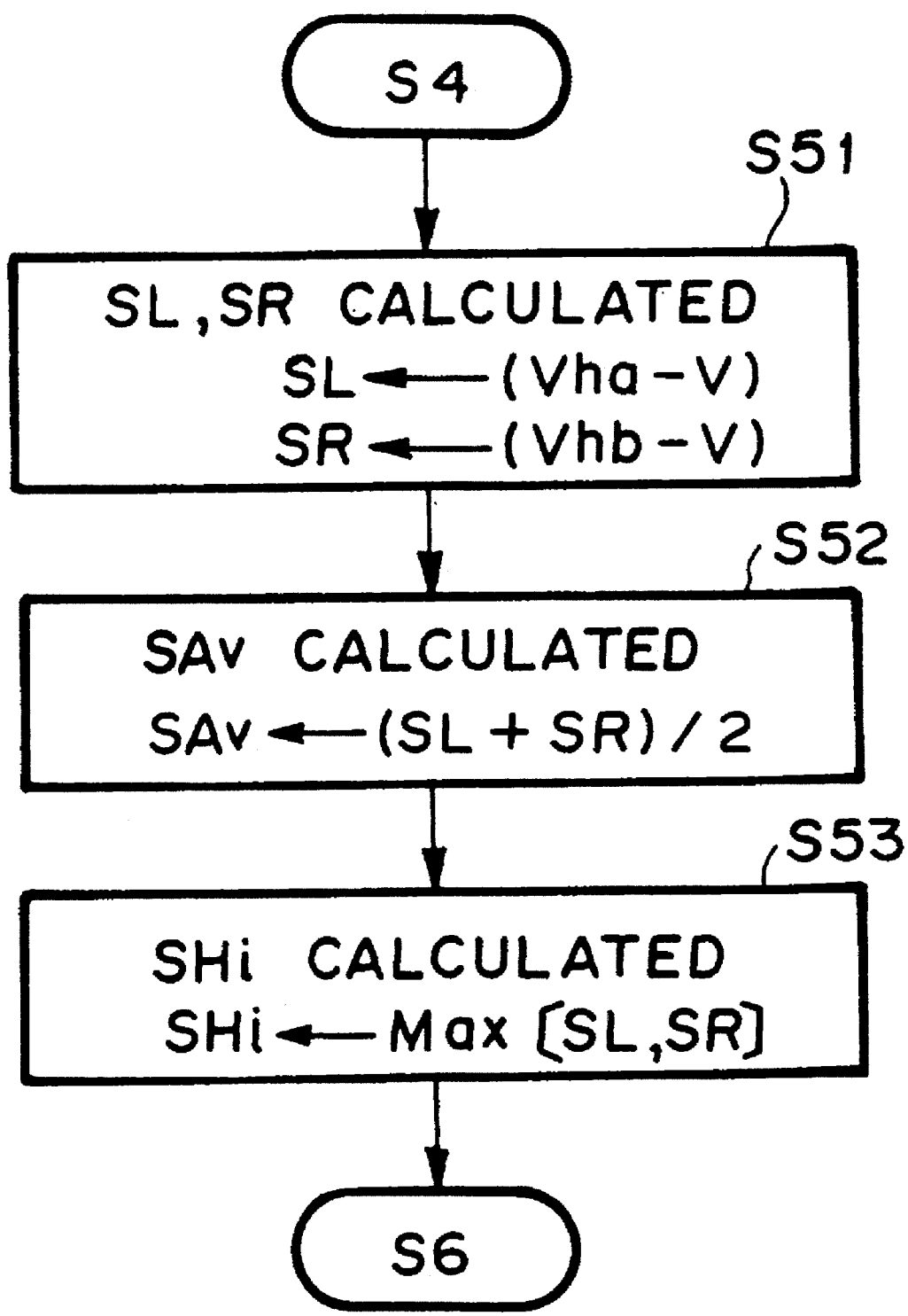
FIG. 4 is a flow chart for illustrating the routine of step S5 of the flow chart shown in FIG. 2.

In the flow chart shown in FIG. 2, the slip control is initiated in response to start of the engine 4, and the slip control section first reads the detecting signals such as representing the steering angle θ from the sensors described above. (step S1) Then in step S2, the slip control section calculates the actual radius of turn Rr, the steering-angle-based radius of turn Ri, the vehicle speed V and the friction coefficient θ of the road surface on the basis of the detecting signals. The actual radius of turn Rr is calculated according to the following formula (1) on the basis of the wheel speeds V1 and V2 of the driven wheels 3a and 3b detected by the wheel speed sensors 9c and 9d.

$$Rr = Min(V1, V2) \times Td \div |V1 - V2| + 0.5Td \qquad (1)$$

wherein Td represents the tread of the vehicle (e.g., 1.7m).

The steering-angle-based radius of turn Ri substantially corresponds to the radius of the circle on which the vehicle moves when the steering tendency is neutral and is obtained by linear interpolation from the following table 1 on the basis of the absolute value of the detected steering angle θ.

TABLE 1

| |θ| | Ri(m) | |θ| | Ri(m) |
|---|---|---|---|
| 15° | 150 | 255° | 10 |
| 30° | 85 | 340° | 8 |
| 85° | 30 | 425° | 6 |
| 170° | 15 | 510° | 5 |

The vehicle speed V is determined as the higher of the wheel speeds V1 and V2 of the driven wheels 3a and 3b detected by the wheel speed sensors 9c and 9d.

The friction coefficient μ of the road surface is calculated on the basis of the vehicle speed V and the vehicle body acceleration Vg.

In the calculation of the friction coefficient μ of the road surface, a 100 msec-count timer and a 500 msec-count timer are used. Until 500 msec lapses after initiation of the slip control where the vehicle body acceleration Vg is not sufficiently large, the vehicle body acceleration Vg is calculated every 100 msec on the basis of the change in the vehicle speed V in the 100 msec according to the following formula (2). After 500 msec lapses after initiation of the slip control where the vehicle body acceleration Vg has become sufficiently large, the vehicle body acceleration Vg is calculated every 100 msec on the basis of the change in the vehicle speed V in each 500 msec according to the following formula (3). In the formulae (2) and (3), V(k) represents the present vehicle speed, V(k–100) represents the vehicle speed 100 msec before and V(k–500) represents the vehicle speed 500 msec before, with K1 and K2 respectively representing predetermined constants.

$$Vg = K1 \times \{V(k) - V(k-100)\} \qquad (2)$$

$$Vg = K2 \times \{V(k) - V(k-500)\} \qquad (3)$$

The friction coefficient μ of the road surface is calculated by three-dimensional interpolation according to the friction coefficient table shown in the following table 2 on the basis of the vehicle speed V and the vehicle body acceleration Vg thus obtained.

TABLE 2

| | $0 \to V_g \to$ increase | | | | | | | |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| V(Km) | 1.0 | 1.0 | 2.0 | 3.0 | 3.0 | 4.0 | 4.0 | 5.0 | 5.0 |
| ↓ | 1.0 | 1.0 | 2.0 | 3.0 | 4.0 | 4.0 | 5.0 | 5.0 | 5.0 |
| high | 1.0 | 1.0 | 2.0 | 3.0 | 4.0 | 5.0 | 5.0 | 5.0 | 5.0 |
| | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| | 1.0 | 2.0 | 3.0 | 5.0 | 5.0 | 5.0 | 5.0 | 5.0 | 5.0 |

Then in step S3, the lateral acceleration G and the lateral-acceleration-based correction coefficient k are calculated. This routine will be described with reference to FIG. 3, hereinbelow.

The lateral acceleration G is determined according to the radius of turn and the vehicle speed V. In this embodiment, the actual radius of turn Rr and the steering-angle-based radius of turn Ri are selectively used as the radius of turn. That is, the degree of tendency of the vehicle to deviate from the line defined by the steering-angle-based radius of turn Ri is determined on the basis of the road surface condition and the driving condition, and when the degree of the tendency is high, the steering-angle-based radius of turn Ri is used while when the degree is low, the actual radius of turn Rr is used.

The slip control section determines whether the absolute value of the steering angle θ is not smaller than a predetermined value θo in step S41 (FIG. 3), determines whether the vehicle speed V is not lower than a predetermined value Vo (step S42) and determines whether the friction coefficient μ of the road surface is not larger than a predetermined value μo (step S43). When it is determined that the absolute value of the steering angle θ is not smaller than the predetermined value θo, the vehicle speed V is not lower than the predetermined value Vo and the friction coefficient μ of the road surface is not larger than the predetermined value μo, the lateral acceleration G is calculated on the basis of the steering-angle-based radius of turn Ri (step S44) and otherwise the lateral acceleration G is calculated on the basis of the actual radius of turn Rr. (Step S45) Then the slip control section calculates the lateral-acceleration-based correction coefficient k on the basis of the lateral acceleration G calculated in step S44 or S45. (step S46)

The lateral acceleration G is calculated on the basis of the radius of turn R (the steering-angle-based radius of turn Ri or the actual radius of turn Rr) and the vehicle speed V according to the following formula (4).

$$G = V \times V \times (1/R) \times (1/127) \quad (4)$$

In step S46, the lateral-acceleration-based correction coefficient k is calculated according to a correction coefficient table (table 3).

TABLE 3

| G | k | G | k |
|---|---|---|---|
| 0 | 1 | 0.7 | 0.6 |
| 0.1 | 0.9 | 0.9 | 0.5 |
| 0.3 | 0.8 | 1 | 0 |
| 0.5 | 0.7 | | |

Then the slip control section sets in step S4 (FIG. 2) the threshold value for determination of slip. The threshold value for determination of slip is set to the product of a base threshold value and the lateral-acceleration-based correction coefficient k. The base threshold value is calculated by three-dimensional interpolation according to a first base-threshold-value table shown in table 4 or a second base-threshold-value table shown in table 5 on the basis of the vehicle speed V and the friction coefficient μ of the road surface. The first base-threshold-value table is for determining whether the slip control is to be initiated and the second base-threshold-value table is for determining whether the slip control is to be continued.

TABLE 4

| | | $0 \to V \to$ high | | | | |
|---|---|---|---|---|---|---|
| μ | 1 | +10 | +9 | +7 | +6 | +5 | +4 |
| | 2 | +11 | +10 | +9 | +8 | +7 | +6 |
| | 3 | +12 | +11 | +10 | +9 | +8 | +7 |
| | 4 | +13 | +12 | +11 | +10 | +9 | +8 |
| | 5 | +14 | +13 | +12 | +11 | +10 | +9 |

TABLE 5

| | | $0 \to V \to$ high | | | | |
|---|---|---|---|---|---|---|
| μ | 1 | +3 | +3 | +2 | +2 | +1 | +1 |
| | 2 | +4 | +4 | +3 | +3 | +2 | +2 |
| | 3 | +5 | +5 | +4 | +4 | +3 | +3 |
| | 4 | +6 | +6 | +5 | +5 | +4 | +4 |
| | 5 | +7 | +7 | +6 | +6 | +5 | +5 |

Then in step S5, the slip control section calculates the amount of slip.

In this step, the apparent amounts of slip SL and SR of the left and right front wheels 2a and 2b (the driving wheels) are calculated by subtracting the vehicle speed V from the wheel speeds Vha and Vhb of the respective front wheels. (step S51 in FIG. 4) Then the average SAv (=(SL+SR)/2) of the amounts of slip SL and SR is calculated in step S52, and a maximum slip SHi is determined as the larger of the amounts of slip SL and SR in step S53.

In step S6, the slip control section performs determination of slip. The slip control section determines that the slip control is necessary when the following formula (5) is satisfied and sets slip flag SFL to 1.

$$SHi \geq \text{threshold value for determination of slip} \quad (5)$$

Figure 5:
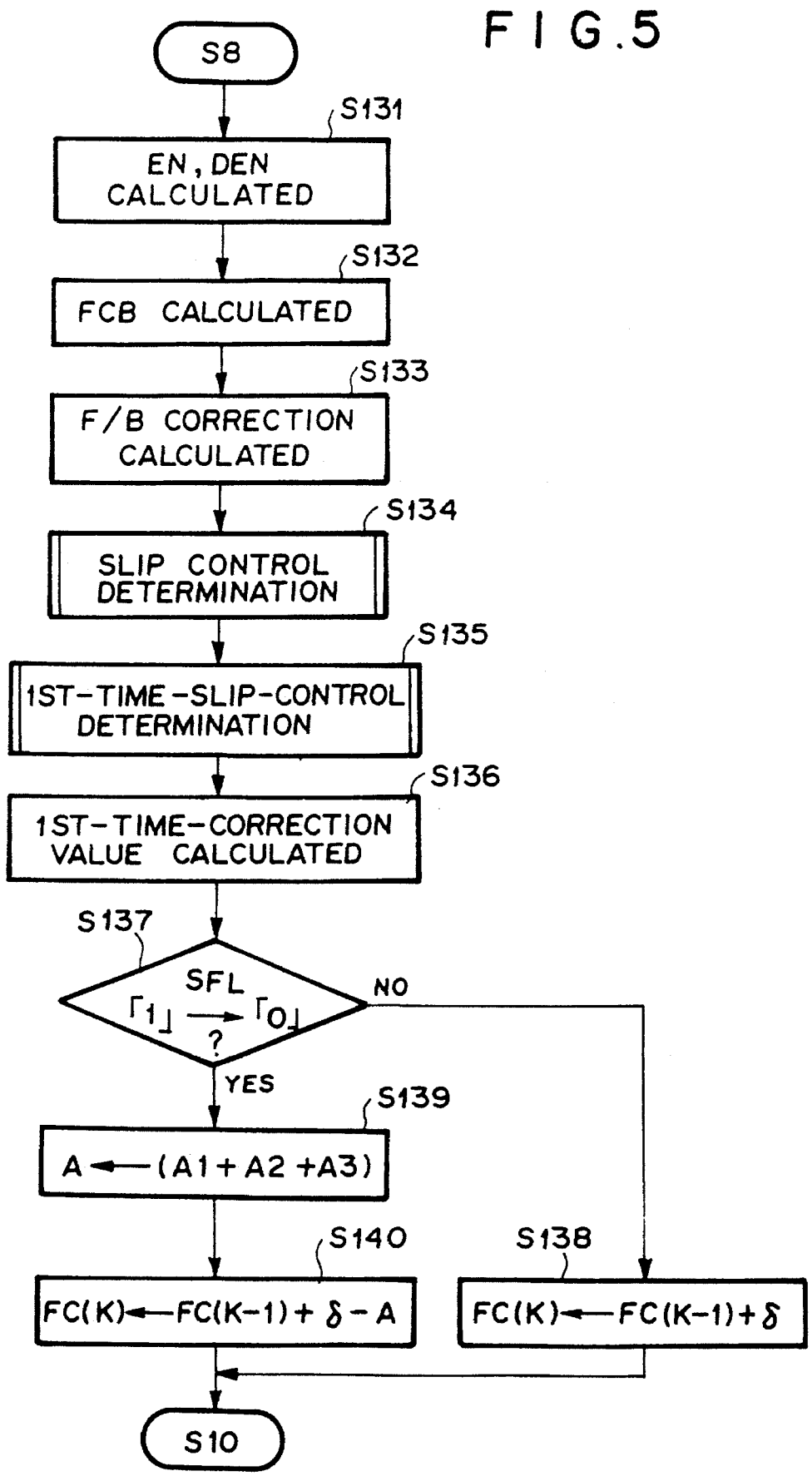
FIG. 5 is a flow chart for illustrating the routine of step S9 of the flow chart shown in FIG. 2.

When it has been determined that the slip control is not being effected (control flag CFL is 0) in step 134 shown in FIG. 5 (to be described later), the threshold value determined from the first base-threshold-value table shown in table 4 for determining initiation of the slip control is used as the threshold value for determination of slip, and when it has been determined that the slip control is being effected (flag CFL is 1) in step 134, the threshold value determined from the second base-threshold-value table shown in table 5 for determining continuation of the slip control is used as the threshold value for determination of slip.

Then in step S7, the slip control section determines whether control flag CFL is 1, and when it is determined that the control flag CFL is not 1(=0), that is, when it is determined that the slip control is not being effected, the slip control section immediately returns. On the other hand, when it is determined in step S7 that the slip control is being effected (the control flag CFL is 1), the slip control section sets the target control value T in step S8.

The target control value T is a target value of the amounts of slip of the front wheels 2a and 2b, and is calculated by multiplying a base target control value by the lateral-acceleration-based correction coefficient k as shown by the following formula (6). The base target control value is calculated by three-dimensional interpolation according to a base-target-control-value table shown in table 6.

$$T = \text{base-target-control-value} \times k \quad (6)$$

TABLE 6

|   |   | \multicolumn{6}{c}{$0 \to V \to$ high} |
|---|---|------|------|------|------|------|------|
| μ | 1 | +5.0 | +4.0 | +3.0 | +3.0 | +3.0 | +3.0 |
|   | 2 | +5.0 | +4.0 | +4.0 | +3.0 | +3.0 | +3.0 |
|   | 3 | +5.0 | +4.0 | +4.0 | +4.0 | +3.0 | +3.0 |
|   | 4 | +6.0 | +5.0 | +5.0 | +4.0 | +4.0 | +4.0 |
|   | 5 | +6.0 | +5.0 | +5.0 | +5.0 | +4.0 | +4.0 |

Then in step S9, the slip control section calculates the control level FC.

The control level FC is set within 0 to 15 by determining a base control level FCB on the basis of the deviation EN of the average SAv of the amounts of slip SL and SR from the target control value T and the rate of change thereof DEN and correcting the same taking into account a first-time-control correction and a feedback correction based on the preceding value FC(K−1) of the control value FC. The first-time-control correction is kept at +5 until the rate of change DSAv of the average SAv of the amounts of slip SL and SR is first reduced to 0 and at +2 until first-time-control flag STFL subsequently becomes 0. The routine in step S9 will be described in more detail with reference to the flow chart shown in FIG. 5.

The deviation EN of the average SAv of the amounts of slip SL and SR from the target control value T and the rate of change thereof DEN are first calculated according to the following formulae (7) and (8). (step S131)

$$EN = SAv(K) - T \quad (7)$$

$$DEN = DSAv = SAv(K) - SAv(K-1) \quad (8)$$

Then the base control level FCB is calculated according to a base-control-level table shown in table 7 on the basis of the deviation EN and the rate of change thereof DEN. (step S132)

TABLE 7

|    |          | \multicolumn{7}{c}{DEN(g)} |
|----|----------|----|----|----|----|----|----|----|
|    |          | \multicolumn{7}{c}{$- \leftarrow 0 \to +$} |
| EN |   −      | −3 | −2 | −1 | −1 | 0  | +1 | +1 |
| (Km/h) | ↑    | −3 | −1 | −1 | 0  | 0  | +1 | +1 |
|    | 0        | −2 | −1 | −1 | 0  | 0  | +1 | +1 |
|    | ↓        | −2 | −1 | 0  | 0  | +1 | +1 | +1 |
|    | increase | −2 | −1 | 0  | 0  | +1 | +1 | +2 |
|    |          | −1 | −1 | 0  | 0  | +1 | +1 | +2 |
|    |          | −1 | 0  | 0  | +1 | +1 | +1 | +2 |
|    |          | −1 | 0  | 0  | +1 | +1 | +1 | +3 |
|    |          | −1 | 0  | 0  | +1 | +1 | +2 | +3 |

In step S133, the preceding control level FC(K−1) is added to the base control level FCB thus obtained (the feedback correction) and in step S134, a slip-control determination is effected. Then a first-time-slip-control determination is effected in step S135 and a first-time-correction value for increasing the control level until the first slip determination is canceled is calculated in step 136.

Figure 6:
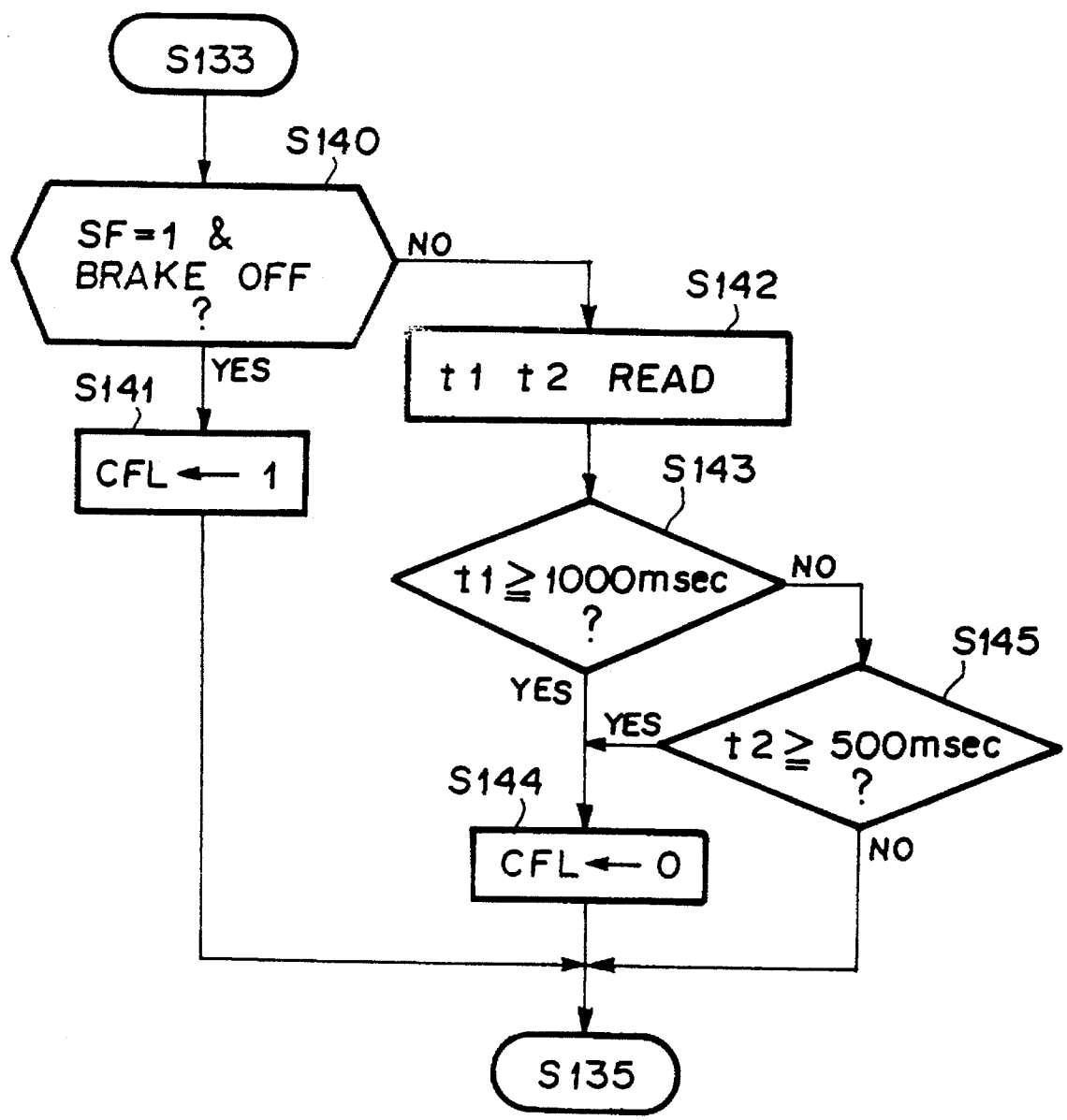
FIG. 6 is a flow chart for illustrating the routine of step S134 of the flow chart shown in FIG. 5.

The routine in step S134 will be described in more detail with reference to the flow chart shown in FIG. 6.

The slip control section determines whether the slip flag SFL is 1 and the brake has not been applied. (step S140)

When it is determined that the slip flag SFL is 1 and the brake has not been applied, the control flag CFL is set to 1 to indicate that the slip control is being effected (step S141) and then the slip control section performs step S135. When it is not determined in step S140 that the slip flag SFL is 1 and the brake has not been applied, the count t1 of a first counter which is provided in the slip control section and counts the duration for which the slip flag SFL keeps at 0 and the count t2 of a second counter which is provided in the slip control section and counts the duration for which the condition, FC≦3, DSAv≦0.3 g, keeps being satisfied are read out in step S142. When the count t1 is not smaller than 1000 msec or when the count t2 is not smaller than 500 msec (steps S143 and S145), the control flag CFL is reset to 0 and then the slip control section performs step S135.

Figure 7:
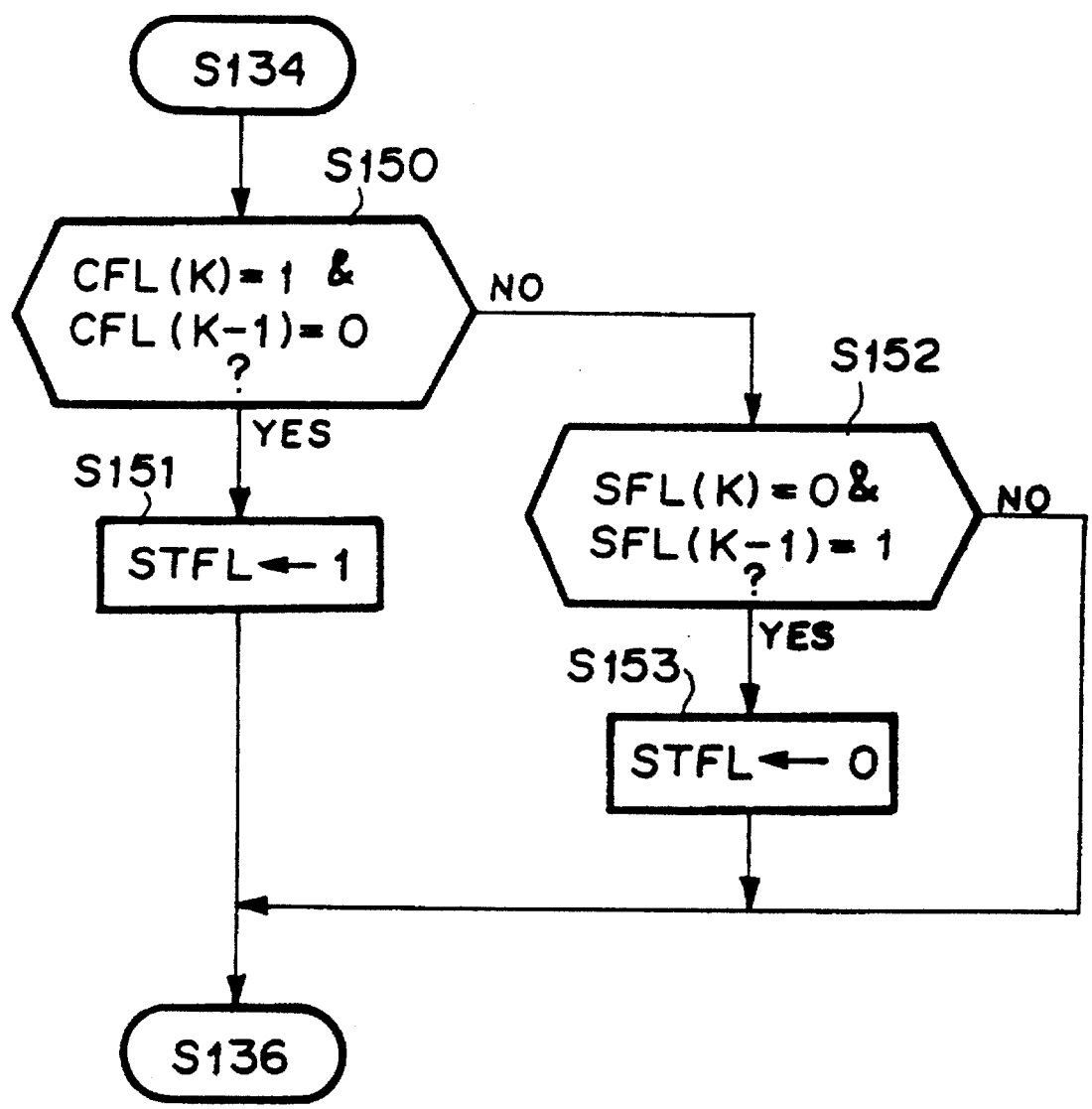
FIG. 7 is a flow chart for illustrating the routine of step S135 of the flow chart shown in FIG. 5.

The routine in step S135 will be described in more detail with reference to the flow chart shown in FIG. 7.

When the present control flag CFL(K) is 1 and at the same time the preceding control flag CFL(K−1) is 0 (step S150), the slip control section proceeds to step S136 after setting first-time-slip-control flag STFL to 1 in step S151. Otherwise the slip control section determines in step S152 whether the present slip flag SFL(K) is 0 and at the same time the preceding slip flag SFL(K−1) is 1. When it is determined that the present slip flag SFL(K) is 0 and at the same time the preceding slip flag SFL(K-1) is 1, the slip control section proceeds to step S136 after resetting the first-time-slip-control flag STFL to 0 in step S153. Otherwise the slip control section directly proceeds to step S136.

In step S136, the slip control section sets the first-time-correction value to +2 when the first-time-slip-control flag STFL is 1 and the rate of change DSAv of the average SAv of the amounts of slip SL and SR (formula 8) is smaller than 0.

In step S137, the slip control section determines whether the slip flag SFL has been changed from 1 to 0, i.e., whether the slip of the driving wheels has converged below the threshold level Sc for continuation. For a certain time after initiation of the slip control when the slip of the driving wheels is above the threshold level Sc for continuation, the answer to the question in step S137 is NO, and the slip control section sets in step S138 the present control level FC(k) to one of the levels 0 to 15 according to the following formula (9).

$$FC(k) = FC(k-1) + \delta \quad (9)$$

Though should be actually added in step S133, the preceding control level FC(k−1) is written here in order to define the present control level FC(k). Further in formula (9), δ is a value equal to the base control level FCB obtained in step S132 or to the value obtained by adding the first-time-correction value to the base control level FCB.

When the slip of the driving wheels exceeds the threshold level Sc for continuation, the slip control section proceeds step S139.

In step S139, the slip control section sets a return gain A for forcing the control level to be small, thereby improving the accelerating performance immediately before and after the end of the traction control. As shown in the following formula (10), the return gain A is the sum of a G-based component A1, a μ-based component A2 and a ΔV-based component A3.

$$A = A1 + A2 + A3 \quad (10)$$

Figure 8:
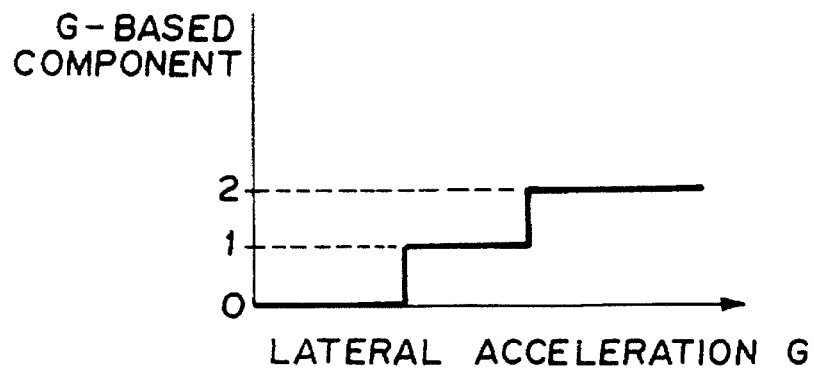
FIG. 8 is a map showing the relation between the lateral acceleration G and the G-based component A1 of the return gain A.

The G-based component A1 is set depending on the lateral acceleration G to be 0 when the lateral acceleration G is small, to be 1 when the lateral acceleration G is medium and to be 2 when the lateral acceleration G is large as shown in the map shown in FIG. 8.

Figure 9:
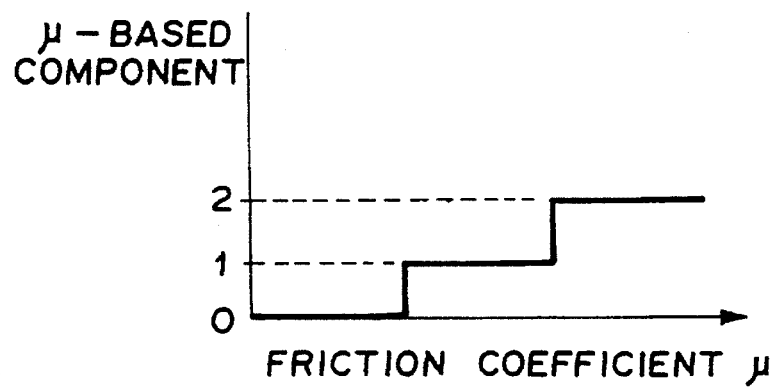
FIG. 9 is a map showing the relation between the friction coefficient $\mu$ of the road surface and the $\mu$-based component A2 of the return gain A.

The μ-based component A2 is set depending on the friction coefficient μ of the road surface to be 0 when the friction coefficient μ of the road surface is low, to be 1 when the friction coefficient μ of the road surface is medium and to be 2 when the friction coefficient μ of the road surface is high as shown in the map shown in FIG. 9.

Figure 10:
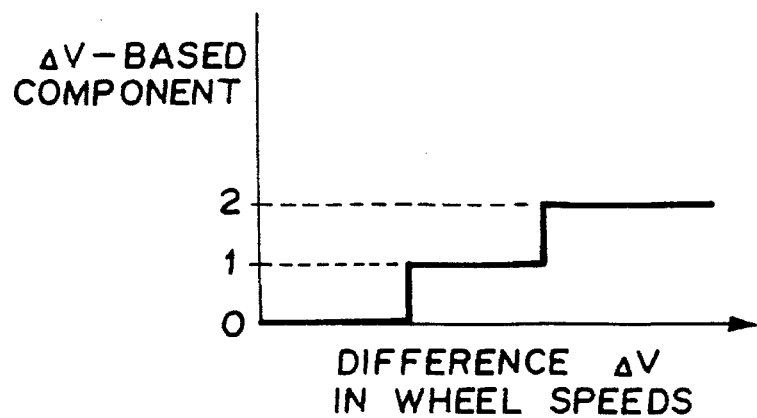
FIG. 10 is a map showing the relation between the difference $\Delta V$ in the wheel speeds of the driving wheels and the $\Delta V$-based component A3 of the return gain A.

The ΔV-based component A3 is set depending on the difference ΔV between the wheel speeds of the inner and outer driving wheels to be 0 when the difference ΔV is small, to be 1 when the difference ΔV is medium and to be 2 when the difference ΔV is large as shown in the map shown in FIG. 10.

Then in step S140 the slip control section sets the present control level FC(k) to one of the levels 0 to 15 according to the following formula (11).

$$FC(k)=FC(k-1)+\delta-A \tag{11}$$

As in formula (9), the preceding control level FC(k−1) is written here in order to define the present control level. FC(k) though should be actually added in step S133. Further in formula (11), δ is a value equal to the base control level FCB obtained in step S132. The return gain A is only set when the slip flag SFL changes to 0 from 1.

That is, when the lateral acceleration G is large, the correction coefficient k is set small and the threshold values (for initiation and for continuation) and the target control value T are set low, which results in a high control level. Further when the friction coefficient μ of the road surface is high, the control level is set high though the threshold values are set high. Further also when the difference ΔV is large, the control level is set high since the maximum slip SHi is large.

Accordingly, in order to improve the accelerating performance immediately before and after the end of the traction control, the control level FC(k) is forced to be small by correcting it with the return gain A which is the sum of the the G-based component A1, the μ-based component A2 and the ΔV-based component A3 which are set to increase respectively with increase in the lateral acceleration G, the friction coefficient μ of the road surface and the difference ΔV between the wheel speeds of the inner and outer driving wheels.

In step S10 in FIG. 2, the slip control section outputs control signals to the engine control section. The control signals includes those for causing the engine control section to retard the ignition timing and for causing the same to effect fuel cut.

Figure 11:
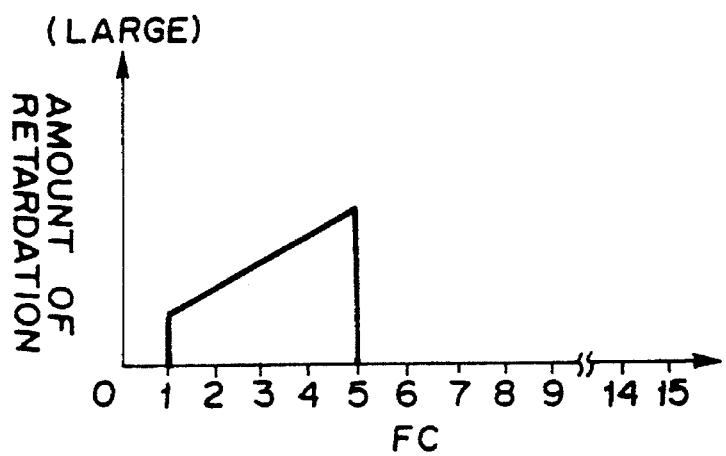
FIG. 11 is a map showing the relation between the control level and the amount of retardation of the ignition timing.
Figure 12:
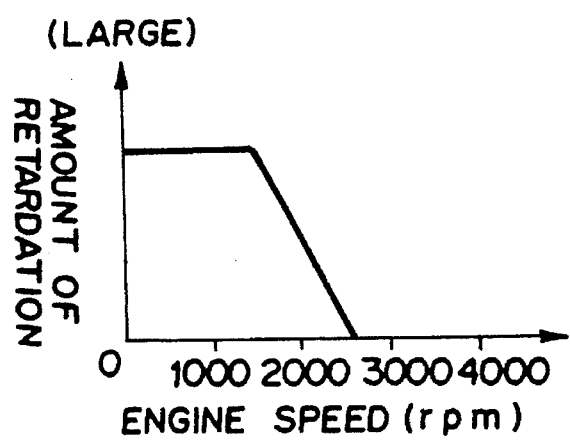
FIG. 12 is a map showing the relation between the engine speed and the amount of retardation of the ignition timing.

The ignition timing is retarded by an amount determined according to the map shown in FIG. 11 on the basis of the control level FC. In the high engine speed range, the maximum amount of the retardation of the ignition timing is limited based on the map shown in FIG. 12.

Figure 13:
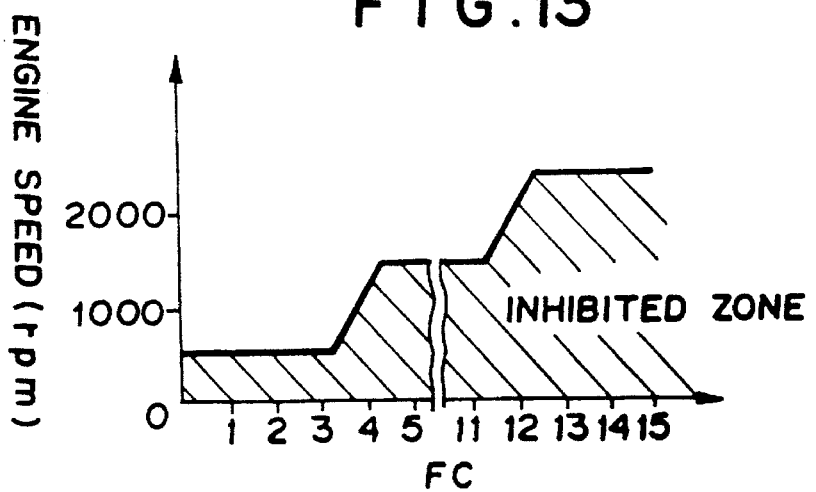
FIG. 13 is a view for illustrating the fuel cut inhibiting zone.

The fuel cut is effected by selecting one of No. 1 to No. 12 patterns shown in table 8 (fuel cut table) on the basis of the control level FC. As the control level FC becomes higher, the larger number of pattern is selected. In table 8, "x" indicates that fuel injection from the injector is cut. In the engine speed range determined for each control level FC shown in FIG. 13, fuel cut is inhibited.

TABLE 8

| pattern No. | \multicolumn{12}{c}{injector number} | note |
|---|---|---|---|---|---|---|---|---|---|---|---|---|---|
| | 1 | 2 | 3 | 4 | 5 | 6 | 7 | 8 | 9 | 10 | 11 | 12 | |
| 0 | | | | | | | | | | | | | no fuel cut |
| 1 | x | | | | | | | | | | | | one C/L half cut |
| 2 | x | | | | | | x | | | | | | one C/L cut |
| 3 | x | | | x | | x | | | | | | | |
| 4 | x | | | x | | | x | | | x | | | two C/L cut |
| 5 | x | x | | x | | | x | | | x | | | |
| 6 | x | x | | x | | | x | x | | x | | | three C/L (one bank) cut |
| 7 | x | x | | x | x | | x | x | | x | | | |
| 8 | x | x | | x | x | | x | x | | x | x | | four C/L cut |
| 9 | x | x | x | x | x | | x | x | | x | x | | |
| 10 | x | x | x | x | x | | x | x | x | x | x | | five C/L cut |
| 11 | x | x | x | x | x | x | x | x | x | x | x | | |
| 12 | x | x | x | x | x | x | x | x | x | x | x | x | all C/L cut |

Figure 14:
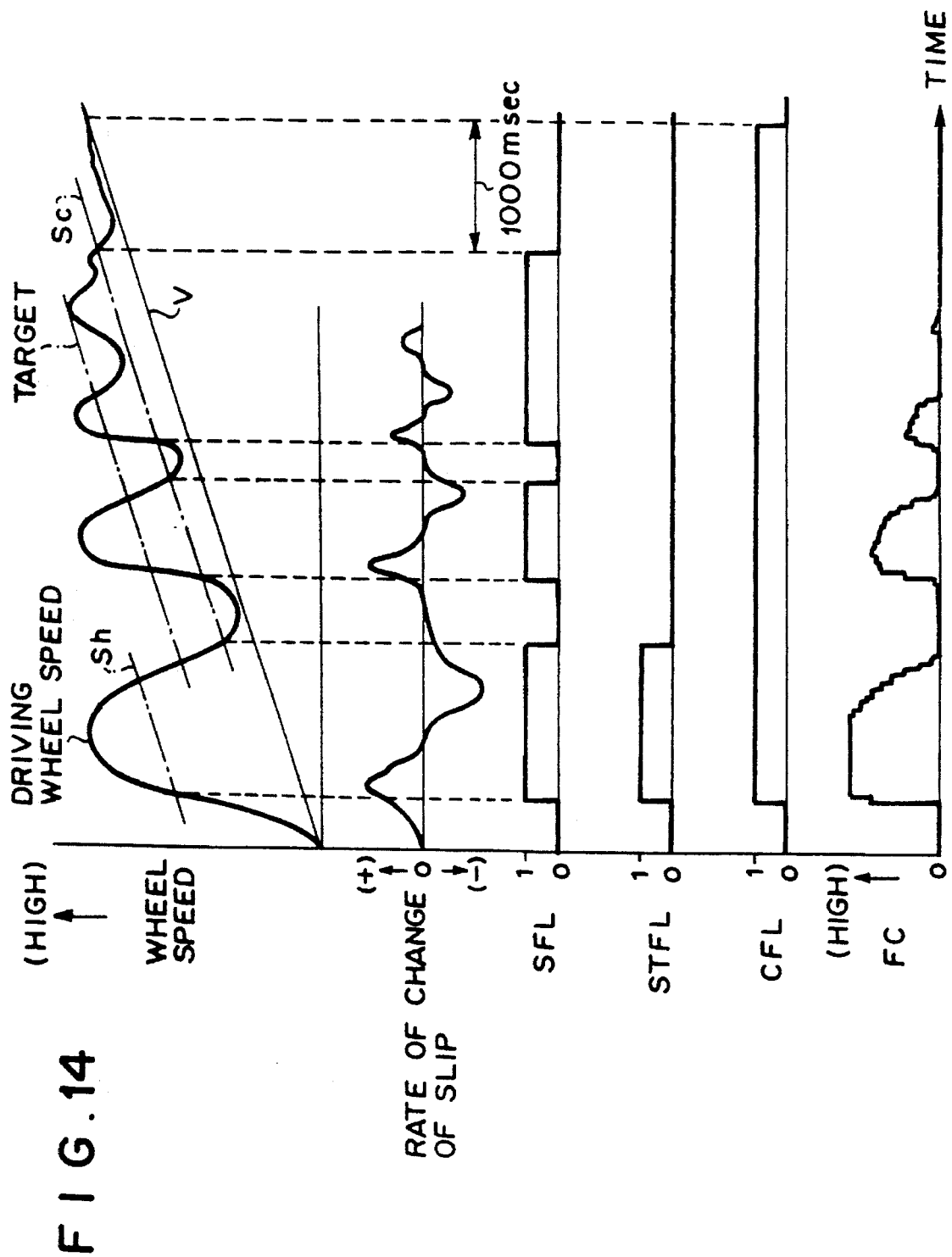
FIG. 14 is a time chart for illustrating the overall slip control action.

The operation of the slip control system can be summarized as follows. As shown in the time chart in FIG. 14, the threshold value Sh for determining whether the slip control is to be initiated is set relatively high according to the first base-threshold-value table and even if the wheel speed of the driving wheels increases due to external forces and the like, the slip control is not initiated so long as the wheel speed does not exceed the threshold value Sh. When the wheel speed of the driving wheels exceeds the threshold value Sh, the slip flag SFL is set to 1, and when the brake has not been applied, the control flag CFL and the first-time-slip-control flag STFL are set to 1 and the slip control is initiated.

When it is determined that the degree of understeer tendency is high during turning, the lateral acceleration G of the vehicle is calculated on the basis of the steering-angle-based radius of turn Ri. Since the steering-angle-based radius of turn Ri is smaller than the actual radius of turn Rr, the lateral acceleration G of the vehicle calculated on the basis of the steering-angle-based radius of turn Ri becomes larger and the correction coefficient k becomes smaller, which results in a relatively low threshold value Sh for determining whether the slip control is to be initiated. Accordingly, the slip control is initiated earlier and the driving torque of the driving wheels is suppressed earlier, whereby the understeer tendency can be prevented from becoming excessively high.

On the other hand, when the understeer tendency is relatively low, the lateral acceleration G of the vehicle is calculated on the basis of the actual radius of turn Rr. Accordingly, the threshold value Sh for determining whether the slip control is to be initiated and the target control value T are precisely corrected to conform to the actual lateral acceleration.

The average amount of slip SAv is calculated on the basis of the amounts of slip of the driving wheels and the target control value T is set on the basis of the vehicle speed V and the friction coefficient μ of the road surface. Then the base control level FCB is set on the basis the difference EN between the target control value T and the average amount of slip SAv and the rate of change DEN of the difference EN. Further the control level FC is calculated by adding the first-time-correction value to the base control level FCB, and the ignition timing and the fuel supply are controlled according to the control level.

When the maximum slip SH falls below the threshold value Sc for determining whether the slip control is to be continued, the first-time-control flag STFL is reset to 0, when the slip control is once interrupted. The threshold value Sc for continuation is set to be relatively low so that slip is surely converged.

Even if the higher of the wheel speeds of the driving wheels falls below the threshold value Sc for continuation, the control flag CFL is kept at 1 so long as the condition continues for at least one second, and when the wheel speed of the driving wheel increases again as a result of interruption of the slip control and exceeds the threshold value Sc for continuation, the slip flag SFL is set to 1 again and the slip control is resumed.

At this time, the first-time-control flag STFL is not set and the first-time-correction of the control level is not performed. Accordingly, the control level FC is set solely on the basis of the base control level, which is set on the basis of the difference NE and the rate of change DEN thereof, and thereafter the control level FC is set by adding the preceding value of the control level FC (feedback correction) to the base control level.

When the slip of the driving wheels is converged on the target value in this manner and the slip flag SFL comes to be kept at 0 more than one second, the control flag CFL is reset to 0 and one slip control cycle ends.

In this embodiment, when the slip of the driving wheels comes into a predetermined state of convergence and the slip flag SFL is changed to 0 from 1, the control level FC is forced to be small by the return gain A, the accelerating performance immediately before and after the end of the traction control can be markedly improved.

At the same time, since the return gain A is set to increase with increase in the lateral acceleration G, the friction coefficient μ of the road surface and the difference ΔV between the wheel speeds of the inner and outer driving wheels, the return gain A can be set depending on the value of the control level FC, whereby the accelerating performance immediately before and after the end of the traction control can be surely improved.

Though, in the embodiment described above, influence of the return gain A remains once the return gain A is set, the return gain A may be canceled when the slip flag SFL is changed to 1 from 0.

What is claimed is:

1. A slip control system for a vehicle comprising a traction control means for effecting traction control in which the amount of slip of the driving wheels of the vehicle relative to the road surface is detected and the torque transmitted to the road surface is controlled with a predetermined control variable when the amount of slip of the driving wheels exceeds a predetermined threshold value so that the amount of slip of the driving wheels converges on a target value wherein the improvement comprises a determining means which detects that the slip of the driving wheels comes into a predetermined state of convergence, a control variable correcting means which sets a return gain according to the value of the control variable when the determining means detects that the slip of the driving wheels comes into the predetermined state of convergence, and corrects the control variable with the return gain so that the control variable is forced to be small.

2. A slip control system as defined in claim 1 in which said control variable correcting means includes a lateral acceleration detecting means and sets the return gain according to the lateral acceleration of the vehicle.

3. A slip control system as defined in claim 2 in which said control variable correcting means sets the return gain according to the lateral acceleration of the vehicle so that the return gain becomes larger with increase in the lateral acceleration of the vehicle.

4. A slip control system as defined in claim 3 in which said control variable correcting means further includes a wheel speed difference detecting means which detects the difference between the wheel speeds of the inner and outer driving wheels of the vehicle and sets the return gain according to the lateral acceleration of the vehicle and the difference between the wheel speeds of the inner and outer driving wheels of the vehicle so that the return gain becomes larger with increase in the lateral acceleration of the vehicle and with increase in the difference between the wheel speeds of the inner and outer driving wheels.

5. A slip control system as defined in claim 4 in which said control variable correcting means further includes a friction coefficient detecting means which detects the friction coefficient μ of the road surface and sets the return gain according to the lateral acceleration of the vehicle, the difference between the wheel speeds of the inner and outer driving wheels of the vehicle and the friction coefficient μ of the road surface so that the return gain becomes larger with increase in the lateral acceleration of the vehicle, with increase in the difference between the wheel speeds of the inner and outer driving wheels and with increase in the friction coefficient μ of the road surface.

6. A slip control system as defined in claim 3 in which said control variable correcting means further includes a friction coefficient detecting means which detects the friction coefficient μ of the road surface and sets the return gain according to the lateral acceleration of the vehicle and the friction coefficient μ of the road surface so that the return gain becomes larger with increase in the lateral acceleration of the vehicle and with increase in the friction coefficient of the road surface.

7. A slip control system as defined in claim 1 in which said control variable correcting means, includes a wheel speed difference detecting means which detects the difference between the wheel speeds of the inner and outer driving wheels of the vehicle and sets the return gain according to the difference between the wheel speeds of the inner and outer driving wheels of the vehicle.

8. A slip control system as defined in claim 7 in which said control variable correcting means sets the return gain according to the difference between the wheel speeds of the inner and outer driving wheels of the vehicle so that the return gain becomes larger with increase in the difference between the wheel speeds of the inner and outer driving wheels.

9. A slip control system as defined in claim 8 in which said control variable correcting means further includes a friction coefficient detecting means which detects the friction coefficient μ of the road surface and sets the return gain according to the difference between the wheel speeds of the inner and outer driving wheels and the friction coefficient μ of the road surface so that the return gain becomes larger with increase in the difference between the wheel speeds and with increase in the friction coefficient µ of the road surface.

10. A slip control system as defined in claim 1 in which said control variable correcting means includes a friction coefficient detecting means which detects the friction coefficient µ of the road surface and sets the return gain according to the friction coefficient µ of the road surface.

11. A slip control system as defined in claim 10 in which said control variable correcting means sets the return gain according to the friction coefficient µ of the road surface so that the return gain becomes larger with increase in the friction coefficient µ of the road surface.

12. A slip control system as defined in claim 1 in which said control variable correcting means includes a lateral acceleration detecting means which detects the lateral acceleration of the vehicle, a friction coefficient detecting means which detects the friction coefficient µ of the road surface and a wheel speed difference detecting means which detects the difference between the wheel speeds of the inner and outer driving wheels of the vehicle, and sets the return gain as the sum of a lateral-acceleration-based component, a friction-coefficient-based component and a wheel-speed-difference-based component which are set according respectively to the lateral acceleration of the vehicle, the friction coefficient µ of the road surface and the difference between the wheel speeds of the inner and outer driving wheels of the vehicle.

* * * * *